(12) United States Patent
Gonzalez

(10) Patent No.: US 7,372,502 B2
(45) Date of Patent: May 13, 2008

(54) CAMERA STABILIZER

(76) Inventor: Rolando Gonzalez, 8981 Helenjames Ave., San Diego, CA (US) 92126

( * ) Notice: Subject to any disclaimer, the term of this patent is extended or adjusted under 35 U.S.C. 154(b) by 607 days.

(21) Appl. No.: 11/080,081

(22) Filed: Mar. 14, 2005

(65) Prior Publication Data

US 2005/0157182 A1    Jul. 21, 2005

Related U.S. Application Data

(63) Continuation-in-part of application No. 10/916,910, filed on Aug. 12, 2004, now Pat. No. 7,097,368, which is a continuation-in-part of application No. 10/671,977, filed on Sep. 26, 2003, now Pat. No. 7,000,879.

(51) Int. Cl.
*H04N 5/225* (2006.01)
*F16M 13/04* (2006.01)
(52) U.S. Cl. .................. 348/373; 224/908
(58) Field of Classification Search ......... 352/243; 224/908; 396/420, 421; D16/243; 348/373
See application file for complete search history.

(56) References Cited

U.S. PATENT DOCUMENTS

| | | | | |
|---|---|---|---|---|
| 2,552,205 A | 5/1951 | Moss | ............... | 95/86 |
| 2,753,778 A | 7/1956 | Tolcher | ............ | 294/139 |
| 2,806,416 A | 9/1957 | Jones | ............... | 95/86 |
| 4,017,168 A * | 4/1977 | Brown | ............ | 352/243 |
| 4,244,500 A | 1/1981 | Fournier | ............ | 224/265 |
| D302,561 S | 8/1989 | Goins | ............ | D16/242 |
| 4,943,820 A | 7/1990 | Larock | ............ | 354/82 |
| 4,967,282 A * | 10/1990 | Malavasi | ............ | 396/420 |
| 5,294,947 A * | 3/1994 | Harrington | ............ | 396/420 |
| 5,332,136 A * | 7/1994 | Rudolph | ............ | 224/908 |
| 5,397,041 A * | 3/1995 | Bruseker | ............ | 224/265 |
| D382,286 S | 8/1997 | Doran | ............ | D16/242 |
| 5,940,645 A * | 8/1999 | Bonin | ............ | 352/243 |
| 6,517,133 B2 | 2/2003 | Seegmiller et al. | ....... | 294/139 |
| 2005/0231634 A1 * | 10/2005 | Chapman | ............ | 348/373 |

FOREIGN PATENT DOCUMENTS

EP    0122332 A1    10/1984

OTHER PUBLICATIONS

Advertisement for Camera Supports, B.H. Photo Video [www.bhphotovideo.com], Mar. 2003.

* cited by examiner

*Primary Examiner*—Lin Ye
*Assistant Examiner*—Jason Whipkey
(74) *Attorney, Agent, or Firm*—Frank G. Morkunas

(57) ABSTRACT

A camera stabilizer having a base for supporting a camera; a first support member for placement on a user's shoulder which has an adjustable rod attachable to the rear of the base; and a second support member for placement at or near a user's waist which has a first adjustable rod component removably connectable to the base and a second adjustable rod component removably connectable to the first support member, each pivotably and biasly connected to one another at their respective bottoms; and a retractable strap on the second adjustable rod component for adjustable placement around a user's back.

15 Claims, 5 Drawing Sheets

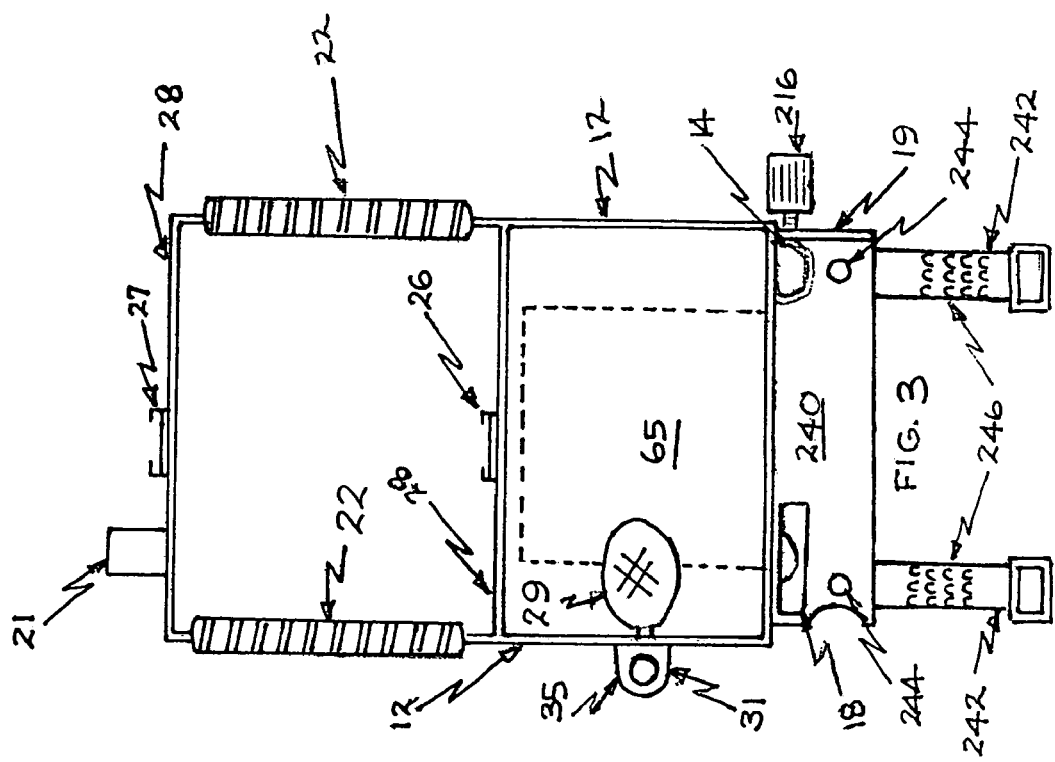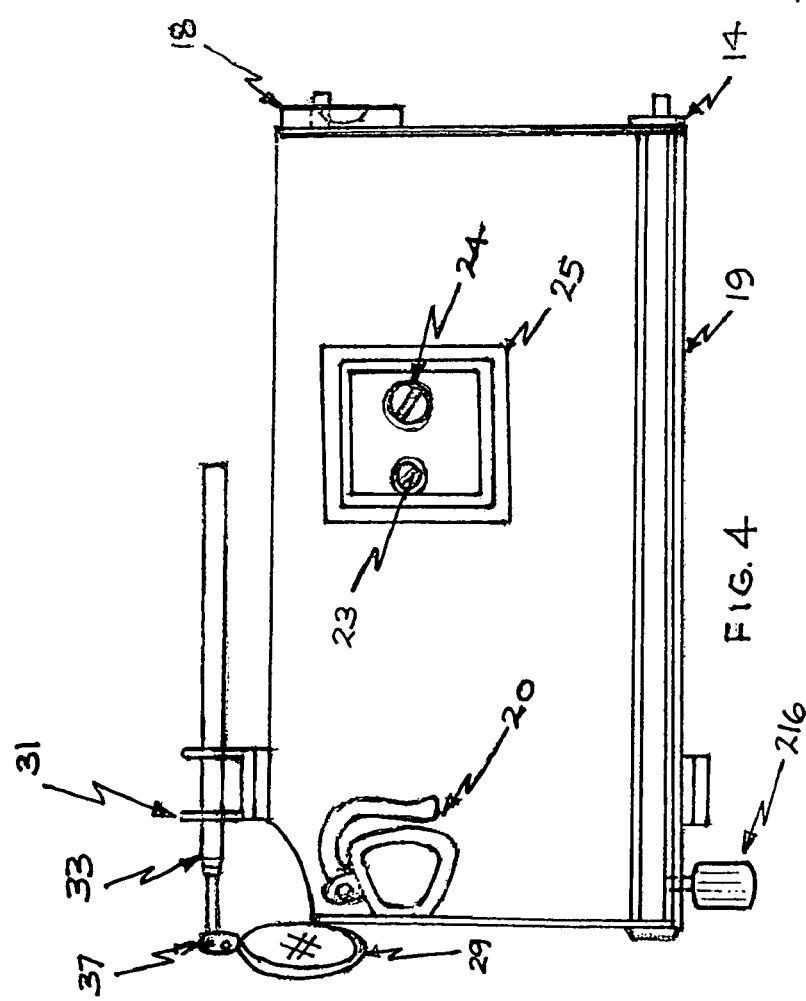

CAMERA STABILIZER

CROSS REFERENCES TO RELATED APPLICATIONS

This application is a continuation-in-part of my application, application Ser. No. 10/916,910, filed on Aug. 12, 2004, now U.S. Pat. No. 7,097,368 which was a continuation-in-part of my prior application, application Ser. No. 10/671,977, filed on Sep. 26, 2003 now U.S. Pat. No. 7,000,879.

STATEMENT REGARDING FEDERALLY-SPONSORED RESEARCH OR DEVELOPMENT

None.

BACKGROUND OF THE INVENTION

This present invention relates to an improvement in camera supports and more particularly to camera stabilizers.

A steady camera for still pictures or moving pictures [movie camera or video camera] makes for better more professional finished pictures. A camera for still pictures, because of its shutter speed, can be hand-held and still be capable of capturing a good quality picture. For more professional results, tripods are generally used.

Holding a moving camera or video camera by hand to capture moving pictures can typically yield a 'jittery' result [for the purpose of all further discussion, such moving pictures will be referred to herein as 'video' and the device as 'video camera' and includes all types of cameras capable of capturing and presenting moving pictures—it must be understood, however, that the camera stabilizer of the present invention may be used with all types of cameras; still, moving, 35 mm, digital, and the like]. Tripods can be used but, once set up, their use is limited in scope in that once the tripod is set on the ground, it generally stays put and the camera operator swivels the mounted camera up and down and back and forth as needed. Should an event require the camera operator to move about to better capture the moments, the end result of the video will be jittery.

Various, more portable and mobile, camera supports and stabilizers have been crafted to meet the needs of the video camera operator to minimize or completely eliminate the jitter effect when recording moving events and moving with the event to better capture it. Most typically involve some form of adjustable rod attachable to the video camera with some form of support structure[s] mountable onto a camera operator. In many different forms, these generally involve some form of telescoping rod from video camera to the operator at or near the operator's shoulder with another telescoping rod from video camera to the operator at or near the operator's waist or chest thereby forming a triangular support structure well-suited for stabilizing the video camera.

All the prior art camera support devices are either complicated in structure and use; costly to manufacture and, concomitantly, costly to buy; and, in spite of the complexities of the device and high cost, do not offer flexibility of use nor do they provide for greater versatility in use. Most merely support the video camera without according the user more features necessary to produce more professional results. My two co-pending applications referenced above generally fill that void. This continuation-in-part present invention, however, further enhances upon my previously filed applications.

Accordingly, several objects and advantages of my invention are to:

a. provide an advantage for near- and far-sighted users to permit either to easily use either an LCD monitor for viewing or the viewfinder of the video camera;

b. have a camera stabilizer with more than one video monitors attached thereto;

c. produce an inexpensive camera stabilizer which provides excellent vertical and horizontal support for a video camera;

d. provide additional support between operator and camera by stabilization means around the operator's back and upward;

e. introduce a camera stabilizer which easily assembles and dis-assembles;

f. provide for a camera stabilizer which is easily adjustable and extremely easy to use;

g. provide a camera stabilizer which facilitates the use of remote control devices and other camera-related components;

h. create a camera stabilizer which assists the camera operator in registering a level plane; and I. make an easily portable and storable camera stabilizer capable of easy storage and movement from one site to another site.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a camera stabilizer for a camera. The camera stabilizer has a base having a top, a bottom, a front, and a rear; a first support member which has a bottom and an adjustable rod attachable to the rear of the base; and a second support member which has a first adjustable rod component with a top and a bottom and a second adjustable rod component with a top and a bottom wherein the bottom of the first adjustable rod component is pivotably connected to the bottom of the second adjustable rod component with the first adjustable rod component being removably attachable to the bottom of the base and the second adjustable rod component being attachable to the bottom of the first support member.

A retractable strap for wrapping around the back of a user is attached to the second adjustable rod component and a bias member adjacent to the bottoms of the first adjustable rod component and the second adjustable rod component bias the two rod components toward one another for ease of disassembly of the camera stabilizer.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 3 is a rear elevation view of the base component of the camera stabilizer.

FIG. 4 is a bottom plan view of the base component of FIG. 3.

DETAILED DESCRIPTION OF THE INVENTION

Figure 1A:
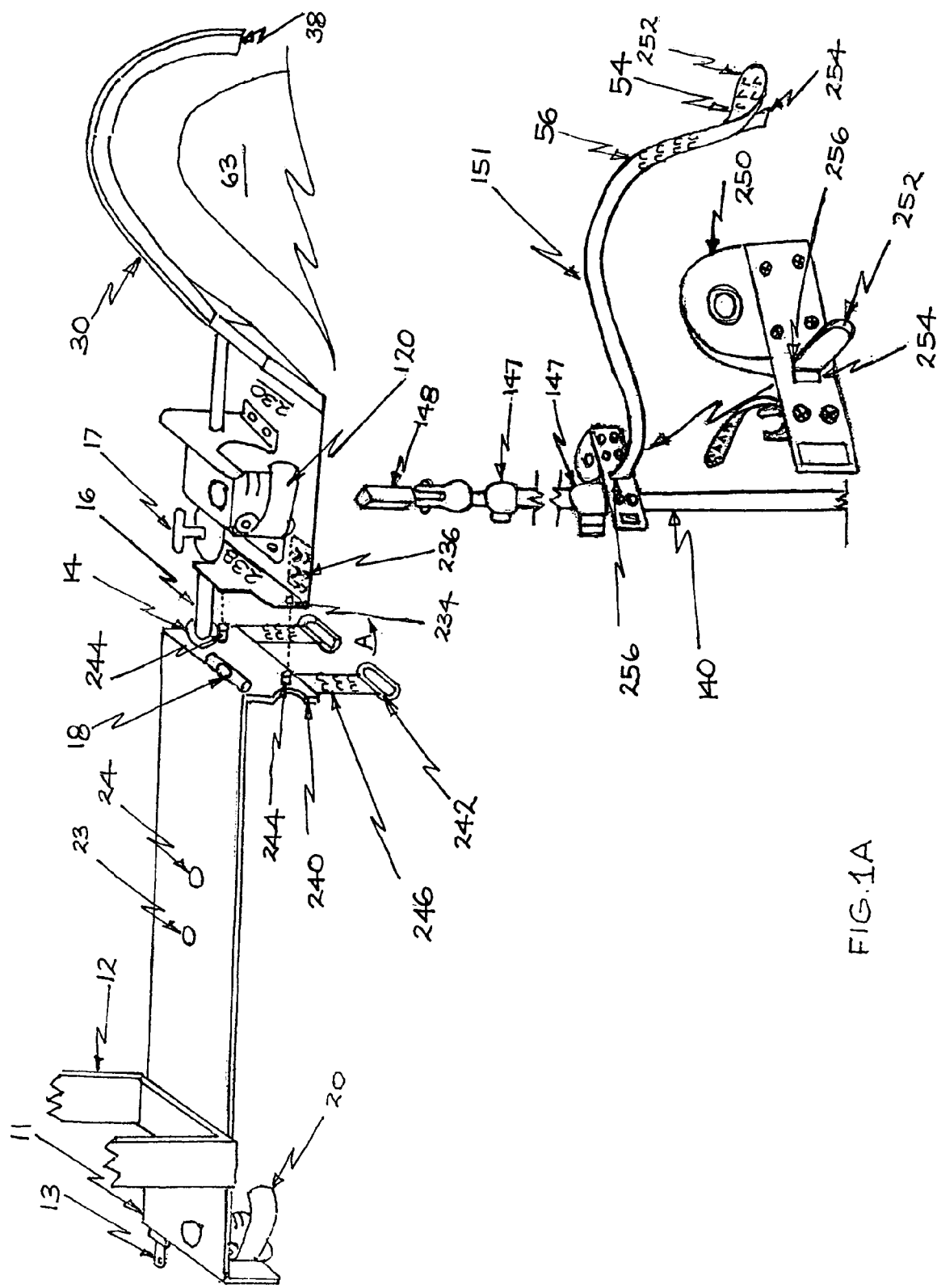
FIG. 1A is a perspective partial view of the camera stabilizer illustrating the upper section and a portion of an adjustable rod.
Figure 1B:
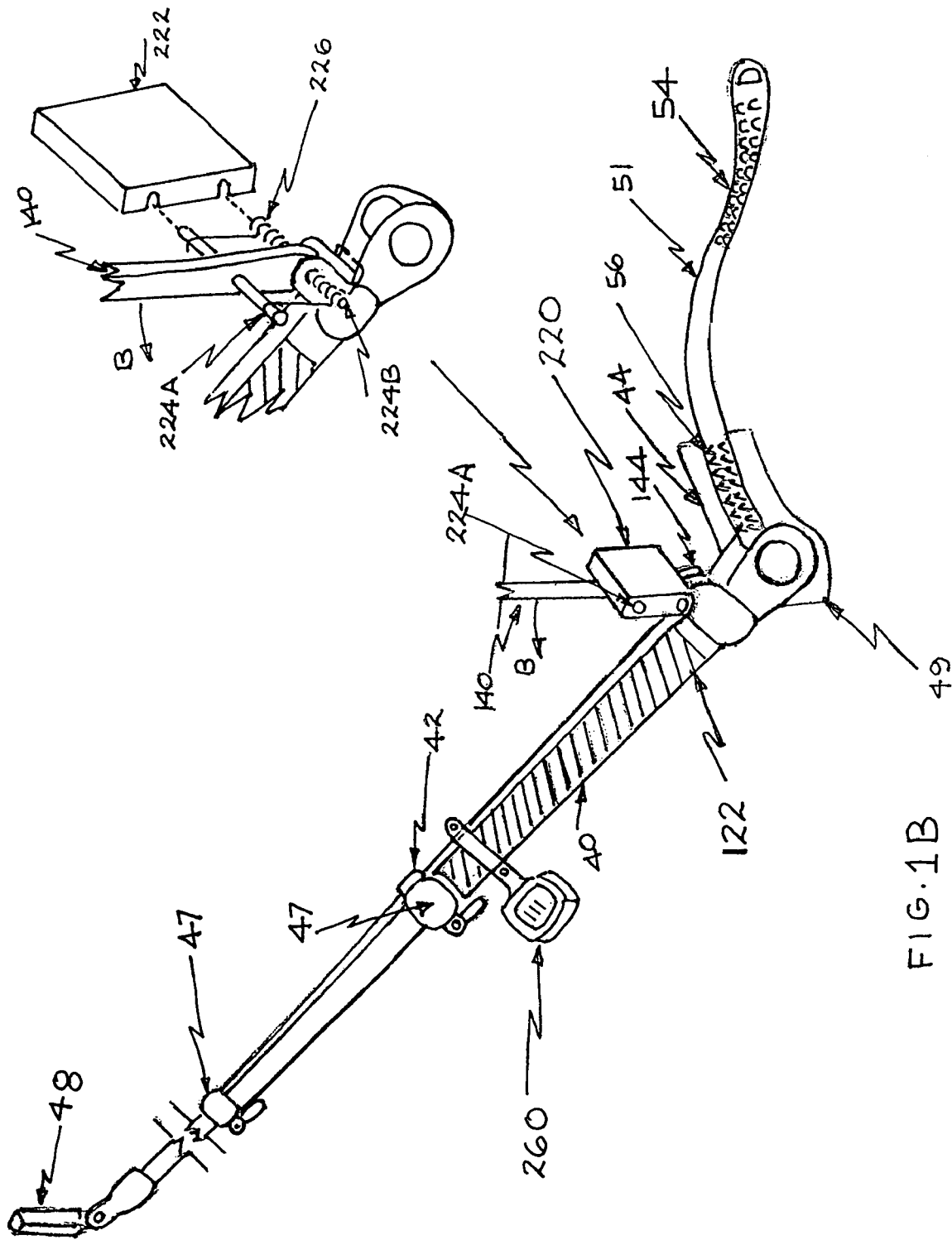
FIG. 1B, a continuation of FIG. 1A, is a perspective partial view of the camera stabilizer illustrating another adjustable rod and a detailed view of its connection to the prior adjustable rod.
Figure 2:
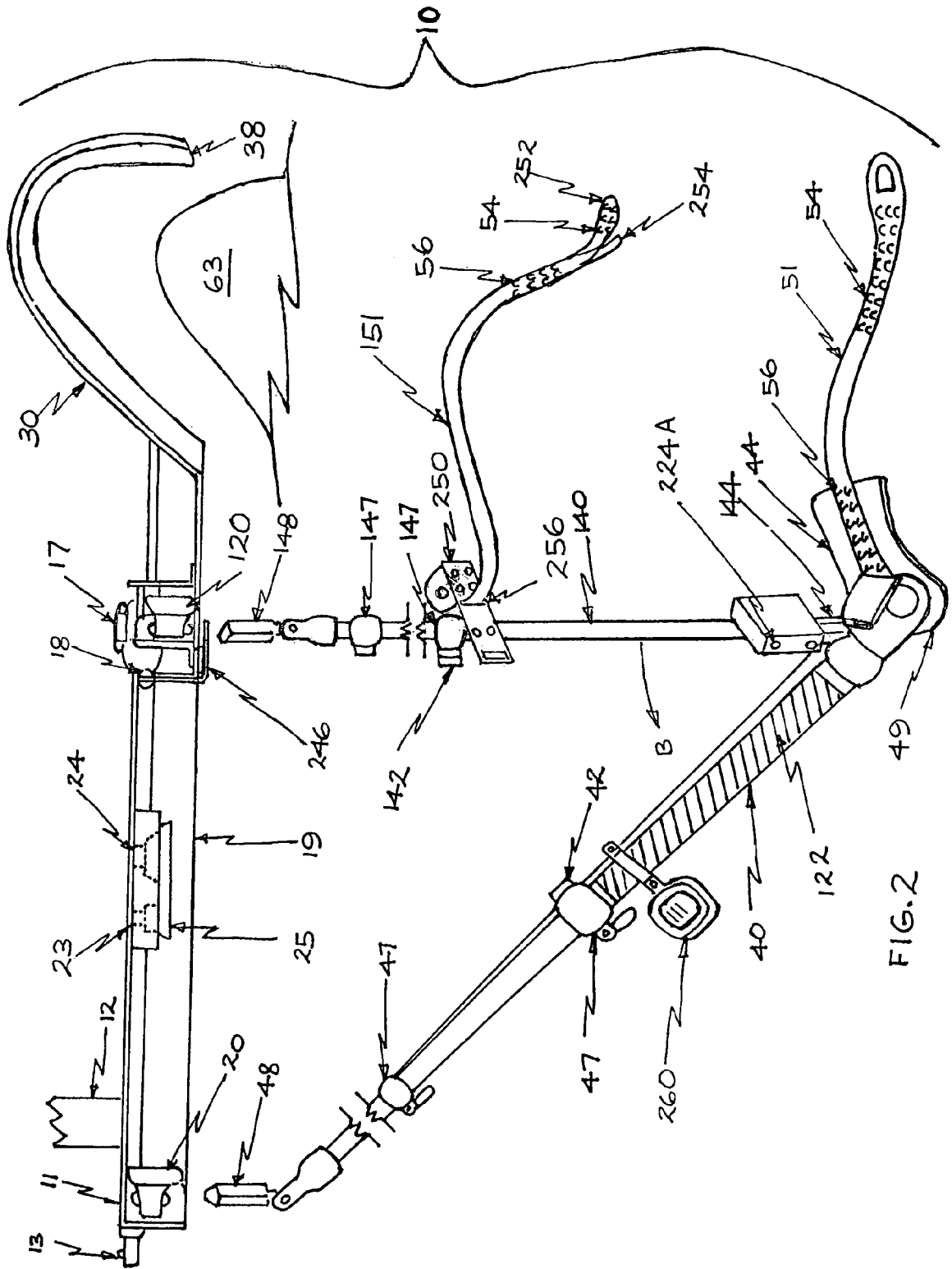
FIG. 2 is a perspective view, combining FIGS. 1A and 1B, illustrating the complete camera stabilizer.

Referring now to the drawings in detail and in particular to FIGS. 1A and 1B and FIG. 2, reference character 10 generally designates a camera stabilizer constructed in accordance with a preferred embodiment of the present invention. The base component 11 supports and secures a camera. Most cameras have a threaded aperture on their bottom for mounting the camera onto a tripod for example. In this regard, the camera may be placed on top of the base 11, aligned with aperture 24, and secured thereon by a correspondingly threaded bolt.

Additionally a tripod mounting shoe 25, with its threaded bolt, may be incorporated onto the bottom of the base 11, to accept and secure a camera mounted onto the top of the base 11. The tripod mounting shoe 25 envisioned for this purpose is a conventional quick-release tripod mounting shoe; i.e., one which easily attaches to and releases from a tripod by movement of a single lever and, concomitantly, easily attaches to and releases from the bottom of the base 11. Most such tripod mounting shoes 25 also have an alignment guide-pin which, when placed onto the tripod, align with a receiving aperture on the tripod thereby registering the fit of the tripod mounting shoe onto the tripod.

To accommodate such guide-pins, the base 11 is configured with an alignment aperture 23. This permits easy attachment of the tripod mounting shoe 25 onto the bottom of the base 11 and for easy and quick securement of a camera to the top of the base 11. Also on the rear wall 240 of the base 11 is a receiving aperture 14 into which the adjustable rod member 16 enters the base 11 and registration components 244 for registering with the shoulder base plate 230 [described later]. Also on the rear wall 240, and visible to a user, is a leveling device 18, such as, but not limited to a bubble-type level. At or near to the front of the base 11 is a reflective device 29 [illustrated in FIGS. 3 and 4] the purpose of which is to reflect the transmission of a signal from a remote control device for an external object [e.g., a video camera] to that external object [the video camera].

Figure 5:
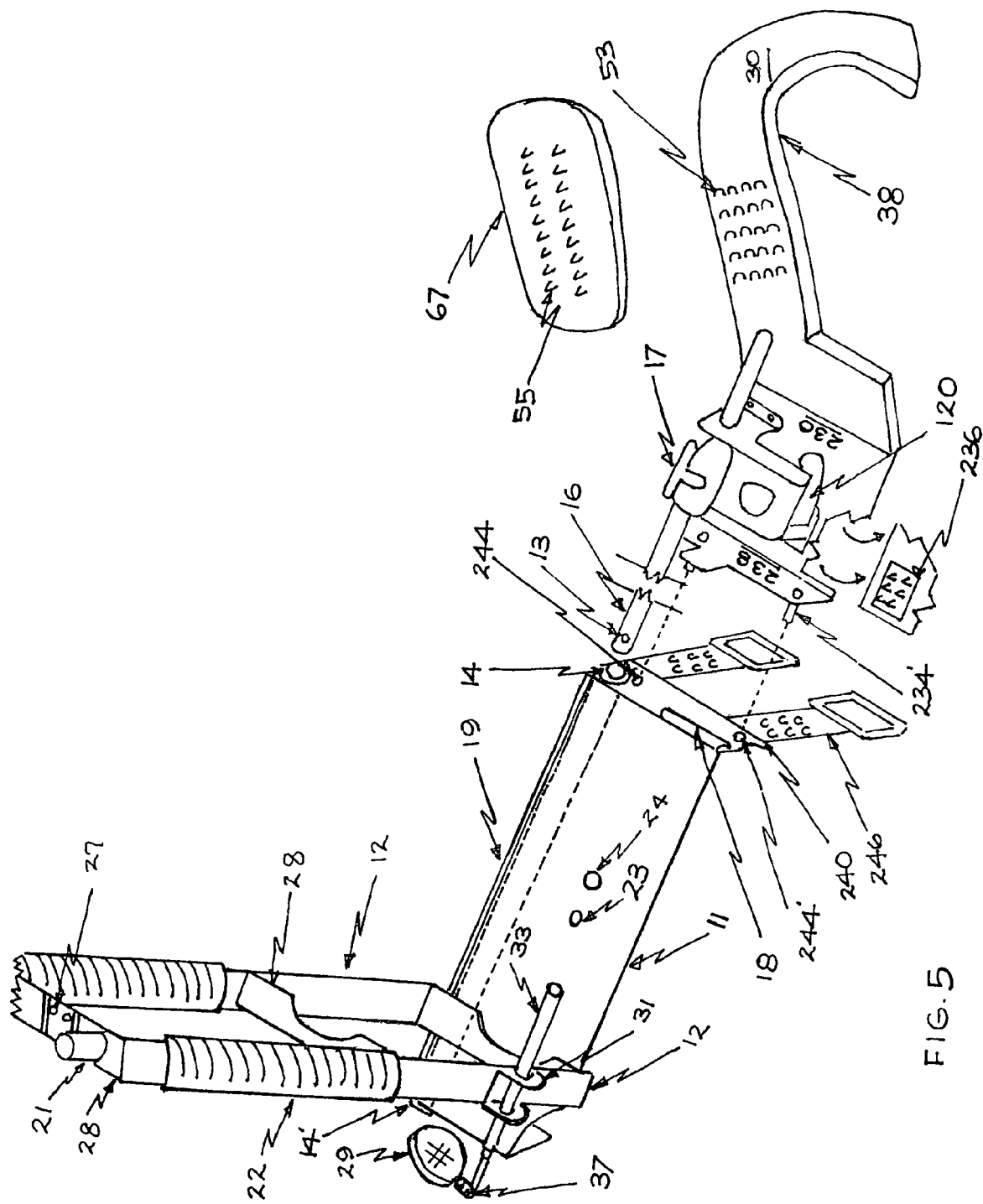
FIG. 5 is a perspective view of the base and rear support component.

As illustrated in FIGS. 4-5, the mirror 29 is connected to an adjustable rod 33, preferably a telescoping rod. The mirror 29 is pivotably connected to the adjustable rod 33 at the forward end 37 of the adjustable rod 33. On one side of the base 11, is a mirror receiver component 31 having one or more apertures 35 and adapted to removably receive the adjustable rod 33 and mirror 29 combination.

A side plate 19 extending downward from the base 11 provides support and comfort for a user's hand. Typically video cameras have a strap on the side of the video camera into which a user may insert the user's fingers with the palm-side against the video camera. Also, typically, the thumb of the user is outside of the strap. The side plate 19 provides a place to support the user's hand when the hand is inserted into the strap of the video camera. This side plate 19 also permits the user to better manipulate the video camera as attached to the base 11. This side plate 19 may, but need not, run the full length of the base 11 from front to rear.

When the camera stabilizer 10 is fully assembled, with camera attached, and is attached to the user 63, this permits a user to establish a perfect horizontal plane when the situation may call for such. On the base 11 there are two apertures, one aperture 14 on the rear wall 240, and the other aperture 14' toward the front of the base 11 and both in alignment with one another. These apertures 14, 14' are adapted to connect the support member 30 to the base 11 by receiving and maintaining therein the adjustable rod member 16 attached to and extending forward, and extendable farther, from the support member 30.

The support member has a shoulder brace 38 which is cushioned on the bottom and generally contoured and cushioned to fit comfortably on a user's shoulder. A shoulder base plate 230 extends forward of the shoulder brace 38 terminating at a vertically disposed front wall 238 which has a registration component 234 thereon. The registration component 234 registers with cooperating registration component 244 on the rear wall 240 of the base 11. One such component may be an aperture or slot while the other cooperating component may be stub, a detent, a pin, or a nub, and the like.

As illustrated in FIG. 1A and FIG. 5 the extending nub or stub 244 is on the rear wall 240 of the base 11 and a cooperating aperture 234 in on the front wall 238 of the shoulder base plate 230. It must be understood, however, that the specific registration elements may be reverse with the aperture 244' on the rear wall 240 of the base 11 and the corresponding nub 234' on the front wall 238 of the base plate 230 as illustrated in FIG. 5.

The underside of this shoulder base plate 230 also has attaching members 236 [illustrated as cut-out from base plate 230 and flipped over], such as, but not limited to one component of a hook-and-loop fastener, to attach to a cooperating component 246 of the hook-and-loop fastener at the rear wall 240 of the base 11; i.e., one component would be the hook element [for example as reference character 246] whereas the other element would be the loop element [reference character 236] and either could interchangeably located provide its cooperating element is placed on the other. Once the support member 30 is registered with the base 11, in addition to locking the adjustable rod 16 in place [discussed later], the strap-like hook element 246 is moved in the direction of arrow A and attached to the underside of the shoulder base plate 230 to the loop element 236 thereon. Also on the shoulder base plate 230 is an attaching member 120.

The adjustable rod member 16 on the shoulder base plate 230 is a telescoping rod which extends forward, and is farther extendable, from the shoulder base plate 230 and insertable into and through apertures 14, 14'. At its distal end, the adjustable rod member 16 has a bias member or detent 13. The distal end is passed through the rear aperture 14 on the rear wall 240 of the base 11 and through the front aperture 14' of the base 11 such that the detent 13 passes forward of the base 11. Once the adjustable rod member 16 is through both apertures 14, 14' backward movement and slippage out of the base 11 is prevented by the detent 13.

A locking component 216 on the side 19 of the base 11, such as a turn-screw, when turned inward presses on the adjustable rod 16 and "locks" it in place preventing forward or rearward movement. The adjustable rod member 16 thereby is securely attached to the base 11. Once so secured, the distance desired between base 11 and first support member 30 may be made by telescoping in or out of the adjustable rod member 16 and, when a desired distance is attained, that distance is locked by engaging the locking device 17 [any conventional clamping, pinching, or screw-like device] on the shoulder base plate 230. As illustrated, such is a screw-like device.

As described, typically, the adjustable rod member 16 is a telescoping-type rod attached to the shoulder base plate 230. The lock member 17 on the should base plate 230, through which the adjustable rod member 16 passes, locks and unlocks on the telescoping component of the adjustable rod member 16 to permit the user to adjust the support member 30 to any desired length away from, or closer to, the base 11 as necessary.

Support member 30, with its shoulder brace 38, is adapted to rest comfortably on the user's 63 shoulder. As illustrated in FIG. 1A it is contoured on the bottom to fit onto the user's shoulder. In this regard, the contoured bottom should be made of a soft or pliable material to provide a cushioned support and comfort for the user. The adjustable rod member 16 may, but need not be, pivotable at this point of attachment.

Once the support member 30 is attached to the base 11 as described above, the support member 30 is placed on a user's 63 shoulder. As described above, the detent 13 and primarily the lock component 216 and lock member 17, when secured, prevent undesired forward and rearward movement of the adjustable rod member 16 and the support member 30. The user may unlock either lock member 17 or lock component 216, or both, and telescope adjustable rod member 16 or support member 30, or both, forward or rearward as desired. Once the desired length is attained, the user may lock either lock member 17 or lock component 216, or both, in place.

A second support member, comprised of a first adjustable rod component 40 and a second adjustable rod component 140, is adapted to attach at each respective upper end 48, 148 to a respective attachment member 20 on the bottom of the base 11 and to the attachment member 120 on the shoulder base plate 230. These attachment members 20, 120 may be any conventional clamping device, pinching device, or squeezing device capable of securely holding the ends 48, 148 inserted therein and capable of easily releasing same.

Additionally, for greater field of view, an auxiliary video camera monitor 260 is attachable to the first adjustable rod component 40. The is a conventional monitor 260 with conventional leads attaching the monitor 260 to the main video camera body 65. This is particularly handy when the user has the camera stabilizer elevated high and it is difficult to view the monitor on the camera body 65. This auxiliary monitor 260, on the first adjustable rod component 40, at or near waist or chest level, facilitates viewing and recording the desired action.

The bottom end 144 of the second adjustable rod component 140 is pivotably attached to the first adjustable rod component 40 at or near to the bottom end 44 of the first adjustable rod component 40. The bottom end 44 of the first adjustable rod component 40 attaches to the user.

The bottom end 44 of first adjustable rod component 40, has a fastening member 51 which is adapted to fasten to the belt or, if the user is belt-less, to any strap-like member [neither shown] provided to and worn by the user 63. The fastening member 51 may have corresponding hook-and-loop 54, 56 fastening components. Any suitable fastening component will suffice. What is important is that the fastening member 51 be fastenable to the user 63 at approximately waist level to provide that sturdy triangular support created by using the camera stabilizer 10.

After suitable back and forth [up and down] movement and adjustment of each adjustable rod component 40, 140, as desired by the user, this second support member may be locked into position by respective locking member 47, 147 on each adjustable rod component 40, 140. Each end point of each adjustable rod component 40, 140 [top end 48 and bottom end 44 of first adjustable rod component 40 and top end 148 and bottom end 144 of second adjustable rod component 140, may be swivelable or pivotable. This swivel/pivot feature permits the user to freely move about, twist and turn, as necessary without adversely affecting the stability of or support for the mounted camera.

For additional support and stability, the second adjustable rod component 140 has at least one adjustable strap-like member distal from fastening member 51. The strap-like member 151 is encased in a retractable component 250 on the second adjustable rod component 140. The retractable component 250 is a conventional retracting component as used for conventional retractable tape measures or seat-belts. The strap-like member 151 is wound about a bias member inside the retractable component and is visible and extractable from, and retractable to, the housing of the retractable component 250 through a slit 256 in the housing.

The end 252 of the strap-like member 151 has a stopper 254 which may be an L-shaped rigid member or may be substantially thicker than the strap-like member 151 such that, when the strap-like member 151 is retracted, the stopper 254 prevents it from completely retracting and facilitates its extraction as necessary. As with a tape measure or seat-belt housing, when the strap-like member 151 is pulled from the housing, it will retain its relative position and not automatically retract. It will retract when quickly, but shortly, pulled farther out and released. The stopper 254 prevents complete retraction.

One or both sides of the strap-like member 151 has one element of a fastening member on it for up to its full length. The other element of the fastening member is on the end 252 of the strap-like member 151. As illustrated, corresponding hook-and-loop 54, 56 fastening members are used. When a user extracts the strap-like member 151 from its housing and wraps the strap-like member 151 around his back, the end 252 with for example the hook element 54 is attachable to any section of the strap-like member 151 containing the corresponding fastening element 56 which, is this example, would be the loop element. It must be understood that either fastening element may be used at the end 252 provided one side of the strap-like member 151 has the cooperating fastening element.

To further ease use of the camera stabilizer system, grip members 22 are on the upstanding support handles 12, and grip members 122 are on adjustable rod component 40. These grip members 22, 122 are conventional grip components as typically used for tennis rackets or golf clubs. They should be soft, pliable, and, preferably, non-slick.

First adjustable rod component 40 and second adjustable rod component 140, as configured, resemble a draftperson's compass, pivoting, from one end of attachment 144 to each other, open and closed and to any open point in between at the other ends 48, 148. A biasing member 220 is at or near to the pivot-point 49. The biasing member 220 has a cover 222 which covers and conceals the spring 226 and stems 224A, 224B which form the biasing member 220. The tension on the spring 226 is forcing movement in the direction of Arrow B [into a closed position; i.e., each rod component 40, 140 toward one another]. The facilitates disassembly of the device.

Additionally, when in a closed position, a holding component 42, 142 on each adjustable rod component 40, 140, in alignment with one another, maintains the second support member 40, 140 in a closed position and prevents unwanted openings. The holding component 42, 142 may be cooperating hook-and-loop fasteners as described above.

Therefore, with the camera 65 mounted on the base 11; the first support member 30 and the second support member 40, 140 attached to the base 11; the first support member 30 rested onto a user's shoulder; the second support member 40, 140 is attached to the user with fastening strap-like member 51 attached approximately waist high and adjustable strap member 151 attached around a user's back and connected together with cooperating fastening components 54, 56, an extremely sturdy and steady camera support system is created.

FIG. 3 illustrates yet additional features of the camera stabilizer 10. This figure highlights the features of the base 11 as viewed from the rear. Here there is shown the rear wall 240, the level 18, the receiving aperture 14 into which the adjustable rod member 16 enters the base 11, the registration components 244 for registering with the shoulder base plate 230, and a strap 242 with its fastening element 246. An external object [camera] is illustrated in phantom line as reference character 65. Extending upward from the base 11 is a support handle 12. One or more such support handle 12 may extend upward from the base 11.

The purpose of the support handle 12 is to aid the user in holding, gripping, and maneuvering the camera to and toward objects of interest to be captured on film. Two such support handles 12 are shown and at least two are best suited for the intended purpose. One or more vertically or horizontally disposed extension 28, or both, extend from the support handle 12 on one side of the base 11 to the support handle 12 on the opposite side of the base 11. A camera accessory mounting shoe 26, 27 may be on any one or more of the vertical or horizontal extensions 28. These mounting shoes 26, 27 are adapted to receive any conventional camera accessory such as, but not limited to, a flash and a light meter.

An extension 21 on top of the upper most horizontal extension 28 also serves to accept an external video light [not shown]. This video light holder 21 is adapted to accept and hold a conventional video light which may be necessary to illuminate the objects to be filmed in situations where natural lighting is insufficient for that purpose.

It is preferred that there be at least two support handles 12 and that there be at least two vertical or horizontal extensions 28 connecting to each support handle 12 as illustrated in FIG. 3. A gripping member 22 may be on either or both support handles 12. It is best that the gripping member 22 be soft and not slick for its purpose is to permit the user to obtain a sure grip on the camera stabilizer 10. This gripping member may be foam [covered or uncovered], cushion, tape, rope, or string and it may be made of any material suited for the intended purpose.

The first support member 30 also may have on its top, a coupling component 53 onto which an external object 67 may be attached. If a video camera 65 is used as the object supported on the base 11, a suitable external object 67 for the video camera 65 may be a remote control device. The coupling component 53 of choice is hook-and-loop. As illustrated the loop element is represented by reference character 53 and is on the first support member 30 while the hook element is represented by reference character 55 and is on the remote control device [though the corresponding coupling components may be reversed; i.e., hook element on the first support member 30, loop element on the remote control device].

For many video cameras, having the remote control positioned as such on the shoulder simplifies the operation of the camera in that, the controls on the video camera itself for many video cameras are not well placed for ease of operation with or without use of a tripod or camera stabilizer or support. Remote control devices, on the other hand, are more user-friendly. Therefore, having the capability of using a remote control device with a video camera 65 mounted onto the camera stabilizer 10 of the present invention clearly simplifies use of the video camera 65 in conjunction with the camera stabilizer 10.

The reflective device [mirror] 29 permits this to happen. The remote control device must be placed and positioned onto the first support member 30 such that the signal the remote control device transmits can be reflected off the mirror 29 and onto the photosensor of the receiving component; i.e., the camera 65 of such signal.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not by the embodiments illustrated, but by the appended claims and their legal equivalents.

The invention claimed is:

1. A camera stabilizer for use with a camera, said camera stabilizer comprising:
   a base having a top, a bottom, a front, and a rear;
   a first support member having a bottom and an adjustable rod attachable to the rear of said base; and
   a second support member having first adjustable rod component with a top and a bottom and a second adjustable rod component with a top and a bottom wherein the bottom of said first adjustable rod component is pivotably connected to the bottom of said second adjustable rod component thereby defining a pivot-point, and wherein said first adjustable rod component is attachable to the bottom of said base and said second adjustable rod component is attachable to the bottom of said first support member.

2. The camera stabilizer as claimed in claim 1 wherein said base further comprises a locking component for removably securing said adjustable rod to said base.

3. The camera stabilizer as claimed in claim 1 wherein said base comprises a rear wall with an aperture for receiving said adjustable rod.

4. The camera stabilizer as claimed in claim 3 further comprising a fastening member on said rear wall and a cooperating fastening member on said first support member.

5. The camera stabilizer as claimed in claim 3 wherein said rear wall further comprises a base registration component thereon for registering said base to said first support member.

6. The camera stabilizer as claimed in claim 5 wherein said base registration component comprises one or more nubs or one or more apertures.

7. The camera stabilizer as claimed in claim 1 wherein said first support member further comprises a support registration component thereon for registering said first support member to said base.

8. The camera stabilizer as claimed in claim 7 wherein said support registration component comprises one or more apertures or one or more nubs.

9. The camera stabilizer as claimed in claim 1 wherein said first support member further comprises a base plate to which said adjustable rod is attached and a locking device for locking in place and for unlocking said adjustable rod.

10. The camera stabilizer as claimed in claim 9 further comprising a fastening member on said base and a cooperating fastening member on said base plate.

11. The camera stabilizer as claimed in claim 1 wherein said first adjustable rod component further comprises a removably attachable auxiliary video monitor connectable to the camera.

12. The camera stabilizer as claimed in claim 1 wherein said second adjustable component further comprises a housing having an extractable and retractable elongated strap with an exposed end for extracting and looping said elongated strap around a user.

13. The camera stabilizer as claimed in claim 12 wherein said elongated strap further comprises, on one or both sides of said elongated strap, one element of a fastening member and said exposed end of said elongated strap further comprises a cooperating element of said fastening member.

14. The camera stabilizer as claimed in claim 12 wherein said elongated strap further comprises a stop adjacent to said exposed end to prevent said exposed end from being retracted into said housing.

15. The camera stabilizer as claimed in claim 1 wherein said second adjustable rod component further comprises a bias member adjacent to said pivot-point, said bias member biasing said second adjustable rod component toward said first adjustable rod component.

\* \* \* \* \*